July 31, 1962     R. H. BERKSHIRE     3,047,318
DEVICE FOR THE PRECISION MOUNTING OF A GEAR ON A SHAFT
Filed June 6, 1957     2 Sheets-Sheet 1
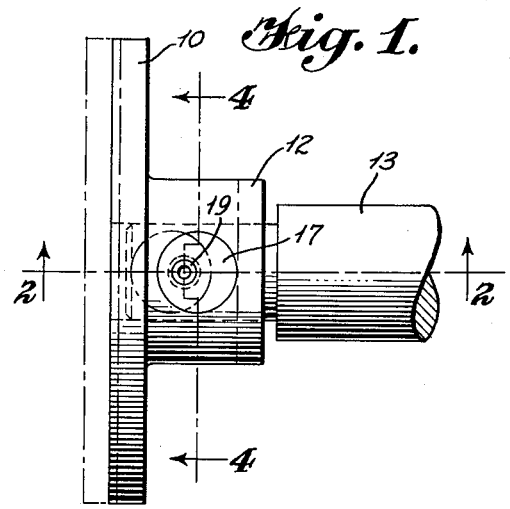
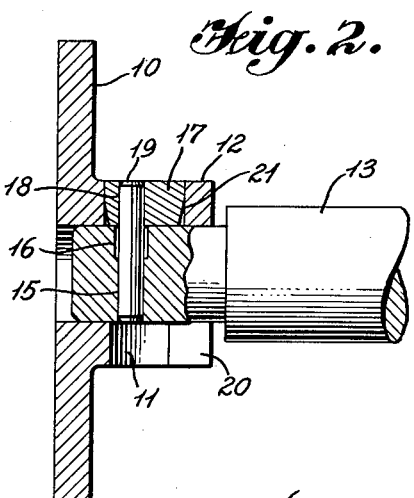
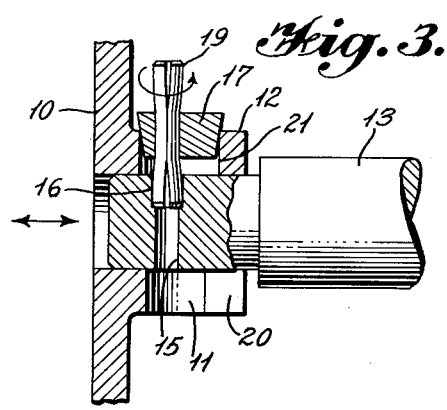
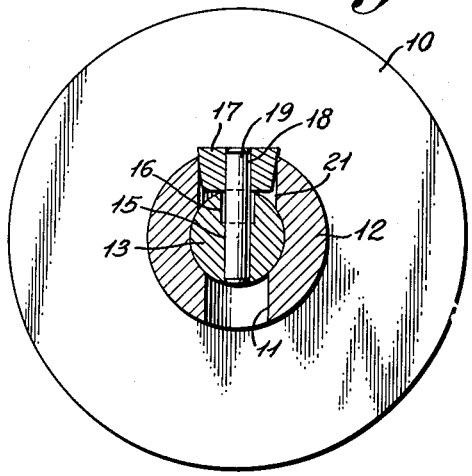
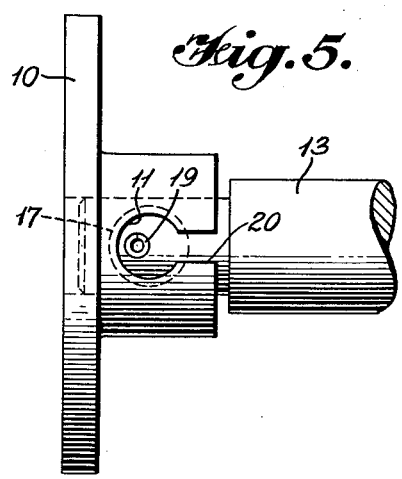
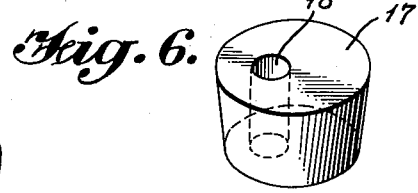
INVENTOR
*Robert H. Berkshire*
BY *Stevens, Davis, Miller & Mosher*
ATTORNEYS July 31, 1962 R. H. BERKSHIRE 3,047,318
DEVICE FOR THE PRECISION MOUNTING OF A GEAR ON A SHAFT
Filed June 6, 1957 2 Sheets-Sheet 2
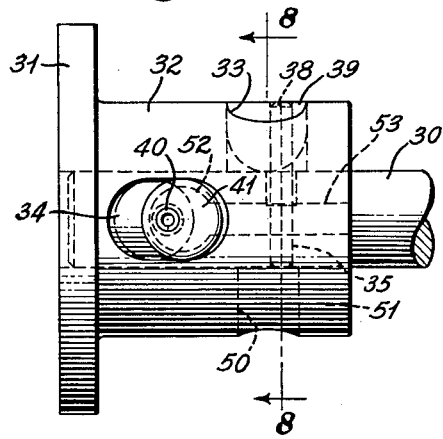
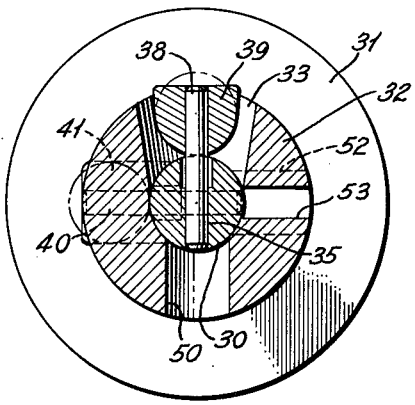
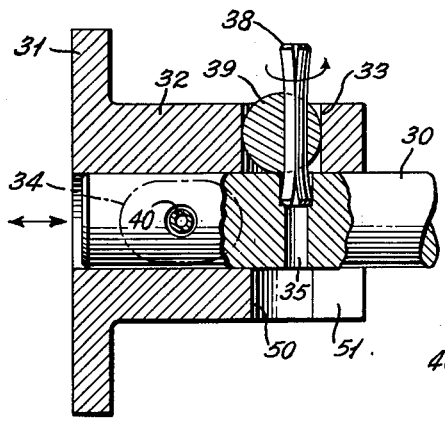
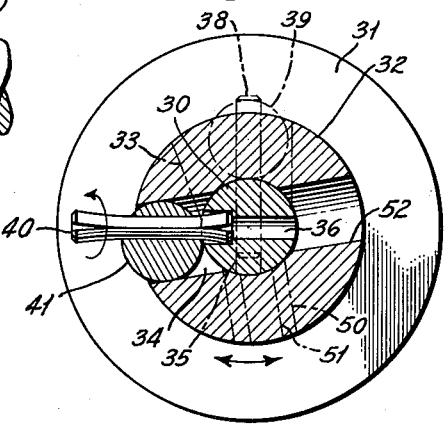
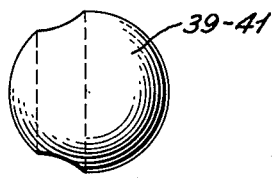
INVENTOR
Robert H. Berkshire
BY *Stevens, Davis, Miller & Mosher*
ATTORNEYS

United States Patent Office 3,047,318
Patented July 31, 1962

3,047,318
DEVICE FOR THE PRECISION MOUNTING OF A GEAR ON A SHAFT
Robert H. Berkshire, Dallas, Tex., assignor to Texas Instruments Incorporated, Dallas, Tex., a corporation of Delaware
Filed June 6, 1957, Ser. No. 664,118
16 Claims. (Cl. 287—52.08)

This invention relates to a means for conveniently and simply mounting a gear or the like on a shaft, and more particularly to a means for mounting a gear or the like on a shaft in a manner to obtain an accurate axial and/or rotational index adjustment of the gear or like element relative to the shaft.

In numerous electronic and electromagnetic devices, it is imperative that elements be mounted on a shaft and adjusted with the utmost precision. Characteristics such as resistance, inductance, capacitance, reluctance, etc., are able to be substantially changed by slight movements of appropriate elements relative to the shaft upon which they are mounted. For example, the precision alignment of a gear on a shaft in the construction of a potentiometer is required in order to obtain a desirable performance from the potentiometer.

It is therefore a principal object of the present invention to provide a device for the precision mounting of a gear or other element on a shaft, especially adapted for use in which the axial and/or rotational index position of the gear on the shaft may be accurately adjusted to exceedingly small distances, and at the same time to provide a device which holds the gear firmly and securely on the shaft in a manner capable of withstanding relatively high torques and yet convenient for disassembly without risk of damage to the gear, shaft, etc.

It is a further object of the present invention to provide a device for the precision mounting and adjusting of a gear on a shaft, especially adapted for use in a potentiometer, in which a plug or ball having an eccentric pin disposed therethrough is employed to adjust the axial and/or rotational index position of the gear on the shaft and to fasten the gear securely to the shaft. The device is used to adjust the gear on the shaft to small tolerances such as less than ±.005 inch and preferably less than ±.001 inch.

Further objects, advantages and specific details of the precision mounting device provided in accordance with the present invention will become readily apparent from the following detailed description of a preferred form of this invention when taken in conjunction with the appended drawings in which:

FIGURE 1 is a top plan view of the precision mounting provided by the present invention showing a disc mounted on a shaft and the associated mounting parts. The dotted lines illustrate alternate positions of the disc;

FIGURE 2 is a sectional view taken along line 2—2 of FIGURE 1;

FIGURE 3 is a view similar to that of FIGURE 2 illustrating the mode of assembly;

FIGURE 4 is a sectional view taken along line 4—4 of FIGURE 1;

FIGURE 5 is a plan view similar to that of FIGURE 1 showing the opposite side;

FIGURE 6 is a view in perspective of the tapered plug;

FIGURE 7 is a plan view showing a modified arrangement;

FIGURE 8 is a sectional view taken along line 8—8;

FIGURE 9 is a sectional view showing the first step in the assembly;

FIGURE 10 is a section view showing the second step in the assembly; and

FIGURE 11 is a view of the ball member.

Referring now to the drawings, a gear or similar element, represented here by the disc 10, is mounted on one end of a shaft 13. Disc 10 includes an annular hub 12 which is received on the end of shaft 13. The end of shaft 13 may be of a smaller diameter than the body of the shaft as shown, but such is not necessary. As is shown in FIGURE 2, the hub 12 is an annular element formed integrally with the central portion of disc 10. An axially extending slot 20 connecting an enlarged hole 11 is defined by hub 12 extending completely through its annular wall. A radial bore 21, having a diameter larger than the width of the slot 20, is provided in the hub 12 diametrically opposite the slot 20 and hole 11.

The end of the shaft 13, which fits into the hub 12 of the disc 10, may be reduced slightly in diameter as mentioned. A radial bore 15 is formed in the end portion of the shaft 13 extending from its surface part way through on a diameter. A bore 16 contiguous with bore 15, but preferably slightly larger in diameter, extends the rest of the way through the shaft 13 on the same diameter. Hence, bores 15 and 16 are coaxial and form a continuation of each other.

A tapered plug 17, preferably made of aluminum or other material of similar malleability, is provided with an eccentric longitudinal bore hole 18 having a diameter approximately equal to that of the bore 15 in the shaft 13. The bottom of the plug 17 has a diameter slightly less than the diameter of the bore 21 to permit its insertion. The top of plug 17 has a diameter greater than that for bore 21 so that it can be conveniently press fitted into the bore 21 of the gear hub 12 during assembly.

A split hollow spring pin 19, having chamfered ends, is provided in a length approximately less than the diameter of the hub 12. When the device is assembled, spring pin 19 is in the position illustrated in FIGURES 2 and 4.

To assemble the device, the disc 10 and hub 12 are placed on the end section of the shaft 13 with the bore 21 substantially aligned with the bores 15 and 16. The tapered plug 17, with the spring pin 19 prepositioned therein, is introduced into the bore 21 with the end of the spring pin 19 received in the bore 16. The assembly is then in the condition illustrated in FIGURE 3. With the device in this condition, the spring pin 19 and plug 17 are rotated, as indicated by the arrow in FIGURE 3, to adjust or set the disc 10 and its hub 12 axially with respect to the shaft 13. Once the proper axial setting has been attained, the assembly is completed by forcing the spring pin 19 into the bore 15 and the tapered plug 17 into the bore 21 of hub 12. FIGURES 1, 2, 4 and 5 illustrate the assembly in its final condition. It will be noted that one end of the spring pin 19 at this time is even with the surface of shaft 13 and its other end even with the upper surface of the plug 17.

A characterizing feature of the assembly is that if the spring pin 19 is accessible from only one side of hub 12, the device can still be rapidly disassembled. The slot 20 and enlarged bore 11 assist materially in the removal of the disc 10 and hub 12. The slot 20 is of sufficient width to clear the spring pin 19 while at the same time does not materially detract from the amount of bearing surface available between the shaft 13 and the hub 12 in this region. The bore 11 is sufficiently large to clear the spring pin 19 at its maximum eccentric position. These features are best illustrated by FIGURE 5.

To disassemble the disc 10 from the shaft 13 the following procedure is recommended. The spring pin 19 is driven into shaft 13 and out of plug 17 so that it projects out of the shaft 13 within the bore 11. At this time, the end of the spring pin 19 which was formerly received in the tapered plug 17 will now lie below the surface of the shaft 13. The disc 10 can then be rotated on the shaft 13 until the projecting end of the spring pin 19 and the slot 20 are radially aligned. When this condition is met, the disc 10 can simply be axially withdrawn from the shaft 13.

There is illustrated in FIGURES 7 to 10 an alternative embodiment of the present invention. Here a device is shown which permits rotational indexing as well as axial adjustment of an element on a shaft. A shaft 30 has received upon one end a disc 31 and an integrally attached hub 32. The hub 32 contains two slots, one of which is designated by the numeral 33 and extends circumferentially about the hub and the other of which is designated by the numeral 34 and extends axially with respect to the hub. In the shaft 30 are bores 35 and 36 so positioned that they may be brought into alignment with the slots 33 and 34 respectively when the disc 31 and hub 32 are placed on the shaft 30. The bores 35 annd 36 extend along diameters of shaft 30 and preferably are enlarged at one end just as the bore 15 (and 16) in the embodiment first described.

Diametrically opposite from the slot 33 in the hub 32 is defined an enlarged bore 50 and a contiguous slot 51 that extends to the free end of the hub 32. In hub 32, opposite from slot 34, is defined an enlarger bore 52 and a contiguous slot 53 which also extends to the free end of hub 32.

A spring pin 38, adapted to be prepositioned eccentrically in a sphere or ball element 39, is initially received in the bore 35. The ball element 39 is received in the slot 33. This condition of assembly is illustrated best in FIGURE 9. By the same token, a spring pin 40, adapted to be prepositioned eccentrically in a sphere or ball element 41, is received in the bore 36. The ball element 41 is received in the slot 34. This condition of assembly is best illustrated in FIGURE 10.

Rotation of spring pin 38 and ball element 39 will produce an axial movement of the disc 31 and hub 32 relative to the shaft 30 as illustrated by the arrows in FIGURE 9. Manipulation of the spring pin 40 and ball element 41 by rotating same will produce a rotational movement of the disc 31 and hub 32 with respect to the shaft 30 as illustrated by arrows in FIGURE 10.

In this fashion, the spring pins and ball elements are manipulated to obtain the proper setting or adjustment of the disc 31 with respect to the shaft 30. When the desired rotational indexing and axial adjustments have been obtained, the spring pins 38 and 40 are forced into the bores 35 and 36 in shaft 30 until they are substantially flush with the outer surface of the ball element. At this time, the inner ends of the spring pins 38 and 40 are even with the surface of the shaft 30. Upsetting the exposed end of the ball elements 39 and 41 as illustrated in FIGURE 8 will further secure the adjustment.

As was described earlier, the opposite side or portion of the hub 32 from the slots 33 and 34 is formed with bores and contiguous slots carried out to the free end of the hub 32. By means of these slots, removal of the disc 31 and hub 32 can be facilitated even under circumstances where accessibility is a problem. It is only necessary to drive each of the pins 38 and 40 through the ball elements 39 and 41 until one end is flush with the surface of the shaft 30 and the opposite end projects into the bores 50 and 52 respectively defined in opposite portions of the hub 32. With the necessary manipulation of the disc 31 and integral hub 32, the pins 38 and 40 can be radially aligned with the slots 51 and 53 respectively, and the disc 31 can be axially withdrawn from the shaft 30.

There is illustrated in FIGURE 11 in elevation a typical ball element 39 showing quite clearly the eccentrically positioned through hole or bore.

To those skilled in the art it will be obvious at once that the present invention provides a method of precisely positioning a member on a shaft which is much less expensive and time consuming than previous methods of comparable accuracy such as, for example, manufacturing all the structural and supporting members of the equpiment to such close tolerances that the "stack up" of tolerance cannot exceed the tolerance allowed in positioning the member or by custom fitting each member to its shaft at final assembly by accurately positioning the member on the shaft and then drilling positioning pin holes in the member and the shaft while maintaining their relative position.

Although the above invention has been shown and described with reference to specific embodiments, nevertheless, various changes and modifications such as those obvious to one skilled in the art are deemed to be within the spirit, scope and contemplation of the invention.

What is claimed is:

1. Means for accurately positioning on a shaft a member having an annular hub, said means comprising a first through hole defined along a diameter of said shaft, a second through hole defined along a different diameter of said shaft, a first slot in said annular hub extending in an axial direction, a second slot in said annular hub extending circumferentially part-way around said hub, a first and a second ball element each having an eccentric bore and each being received in said slots and a pin press fitted into each said eccentric bore, each said pin extending into one of said through holes, whereby said hub may be axially adjusted on said shaft by rotation of said ball element in said circumferentially extending slot and said hub may be adjusted rotationally on said shaft by rotation of said ball element in said axially extending slot and whereby said hub thereafter may be tightly fixed to said shaft in said adjusted axial and rotational index position by driving said pins further into said through holes.

2. Means for accurately positioning on a shaft a member having an annular hub, said means comprising a through hole defined along a diameter of said shaft, a radial bore in said annular hub, a tapered plug having an eccentric bore received in said radial bore and a hollow spring pin press fitted in said eccentric bore, said pin extending into said through hole, whereby said hub may be axially precision adjusted on said shaft by rotation of said tapered plug in said radial bore and said hub thereafter may be tightly fixed to said shaft in said precision adjusted axial position by driving said pin further into said through hole and said tapered plug further into said radial bore.

3. Means for accurately positioning on a shaft a member having an annular hub as defined in claim 1 wherein said hub is provided with a third slot extending from a point diametrically opposite said first slot axially to the end of said hub and a fourth slot extending from a point diametrically opposite said second slot axially to the end of said hub whereby said member having an annular hub may be removed from said shaft when said first and second pins are driven completely through said first and second ball elements respectively.

4. A device for the precision mounting of an element on a shaft comprising in combination an element having an annular hub having a radial bore and a radial opening diametrically disposed thereto, a shaft having a radial bore mounted in said annular hub, a tapered plug having an eccentric bore press fitted into said radial bore in said hub, and a pin press fitted through said eccentric bore in said plug and said radial bore in said shaft.

5. A device for the precision mounting of an element on a shaft comprising in combination an element having an annular hub having a radial bore and a radial slot diametrically disposed thereto about the center of said hub, a shaft having a radial bore mounted in said annular hub, a tapered plug having an eccentric bore press fitted into said radial bore in said hub, and a pin press fitted through said eccentric bore in said plug and said radial bore in said shaft.

6. A device for the precision mounting of an element on a shaft comprising in combination an element having an annular hub having a radial bore and a radial slot diametrically disposed thereto about the center of said hub, a shaft having a radial bore mounted in said annular hub, a tapered plug having an eccentric bore press fitted into said radial bore in said hub, and a hollow pin press fitted through said eccentric bore in said plug and said radial bore in said shaft.

7. A device for the precision mounting of an element on a shaft comprising in combination an element having an annular hub having a radial bore and a radial slot diametrically disposed thereto above the center of said hub, a shaft having a radial bore mounted in said annular hub, a tapered plug having an eccentric bore press fitted into said radial bore in said hub, and a pin having a length less than the diameter of said hub press fitted through said eccentric bore in said plug and said radial bore in said shaft with one end of said pin lying flush with the surface of said shaft adjacent said radial slot and the other end of said pin lying flush with the outer surface of said tapered plug.

8. A device for the precision mounting of an element on a shaft comprising in combination an element having an annular hub having a radial bore and a radial slot diametrically disposed thereto about the center of said hub, the width of said slot being smaller than the diameter of said radial bore, a shaft having a radial bore mounted in said annular hub, a tapered plug having an eccentric bore press fitted into said radial bore in said hub, and a pin press fitted through said eccentric bore in said plug and said radial bore in said shaft.

9. A device for the precision mounting of an element on a shaft comprising in combination an element having an annular hub having a radial bore and a radial slot diametrically disposed thereto about the center of said hub, the width of said slot being smaller than the diameter of said radial bore, a shaft having a radial bore mounted in said annular hub, a tapered plug having an eccentric bore press fitted into said radial bore in said hub, and a hollow pin having a length less than the diameter of said hub press fitted through said eccentric bore in said plug and said radial bore in said shaft with one end of said hollow pin lying flush with the surface of said shaft adjacent said radial slot and the other end of said hollow pin lying flush with the outer surface of said tapered plug.

10. Means for the accurately positioning on a shaft a member having an annular hub, said means comprising a through hole defined along a diameter of said shaft, a radial bore in said annular hub, a tapered plug having an eccentric bore, said plug wedged for press fit in said radial bore, and a pin secured in said eccentric bore and in said through hole, said pin being wedged for press fit into said eccentric bore, said pin extending into said through hole before said press fit of said pin and said tapered plug, the plug and the pin cooperating to provide accurate axial adjustment on said shaft of said member by rotation of said tapered plug in said radial bore.

11. Means for accurately positioning on a shaft a member having an annular hub as defined in claim 10 wherein said hub is provided with a slot extending axially from a point diametrically opposite said radial bore to the end of said hub whereby said member having an annular hub may be removed from said shaft when said pin is driven completely through said tapered plug having an eccentric bore.

12. Means for accurately positioning on a shaft a member having an annular hub, said means comprising a through hole defined along a diameter of said shaft, a radial bore in said annular hub, a ball element having an eccentric bore received in said radial bore and a pin wedged for press fit into said eccentric bore, said pin extending through said eccentric bore and into said through hole, said pin fitting loosely in said eccentric bore and said through hole before said press fit, the eccentricity of the bore in said ball element providing small relative movement between said member and said shaft when said pin is loosely inserted in said through hole before said pin and ball element are secured by press fit so that after said press fit said member is tightly and accurately positioned on said shaft.

13. Means for accurately positioning on a shaft a member having an annular hub as defined in claim 12 wherein said hub is provided with a slot extending axially from a point diametrically opposite said radial bore to the end of said hub whereby said member having an annular hub may be removed from said shaft when said pin is driven completely through said ball element having an eccentric bore.

14. Means for accurately positioning a member upon a shaft comprising, an annular hub integral with said member, said annular hub having a radial bore, said shaft having a through hole defined along a diameter of said shaft, an element having an eccentric bore received in said radial bore in said annular hub, and a pin secured in said eccentric bore and extending into said through hole, said hub being tightly fixed to said shaft by interference fit of said pin into said through hole and said eccentric bore and interference fit of said element in said radial bore, said hub having a slot extending axially from a point diametrically opposite said radial bore to the end of said hub, said slot being means for facilitating the removal of said member from said shaft when said pin is driven through said element having an eccentric bore in an outward radial direction.

15. Means for accurately positioning a member upon a shaft having a varying-diameter through hole defined along a diameter of said shaft comprising, an annular hub integral with said member, said annular hub having a radial bore, a tapered plug having an eccentric bore, said tapered plug received in said radial bore in said annular hub, and a collapsible spring pin secured in said eccentric bore, said pin also being positioned in said through hole in order that said hub may be accurately positioned upon said shaft by rotation of said tapered plug in said radial bore and said hub thereafter may be tightly fixed to said shaft by press fit of said tapered plug in said radial bore in said hub and by press fit of said pin in said through hole and said eccentric bore, said hub having a slot extending axially from a point diametrically opposite said radial bore to the end of said hub, said slot providing means for removing said member having an annular hub from said shaft when said pin is driven outwardly through said tapered plug having an eccentric bore.

16. Means for accurately positioning a member upon a shaft, said shaft having a through hole, said member having an annular hub with a radial bore, comprising an element having an eccentric bore positioned in said radial bore, said element being press-fitted in said radial bore, and a pin press-fitted into said eccentric bore and said through hole, said pin and said element press fitted after accurate positioning of said member on said shaft provided by cooperation of the pin in the eccentric bore of said element, said hub having a slot extending axially from a point diametrically opposite said radial bore to the end of said hub, said slot providing means for removing said member having an annular hub from said shaft when said pin is driven outwardly through said element having an eccentric bore.

References Cited in the file of this patent
UNITED STATES PATENTS

| | | |
|---|---|---|
| 681,683 | Deck | Sept. 3, 1901 |
| 1,138,799 | Scott | May 11, 1915 |
| 2,355,943 | Beede et al. | Aug. 15, 1944 |